March 15, 1927.  W. D. BLEIER  1,621,454
DEVICE FOR FORMING ALIMENTARY PRODUCTS
Filed March 25, 1926
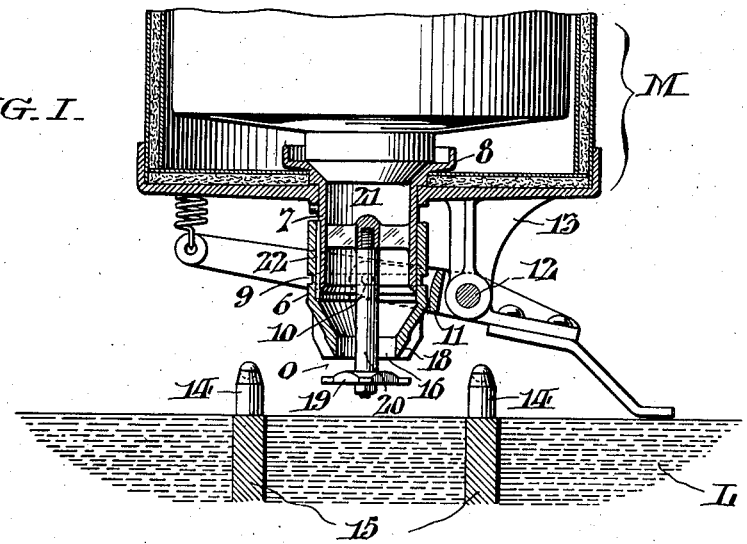
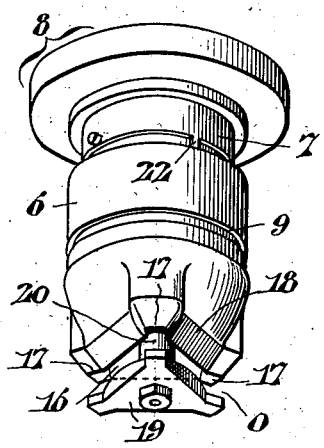
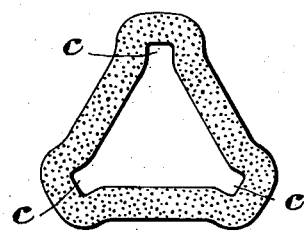
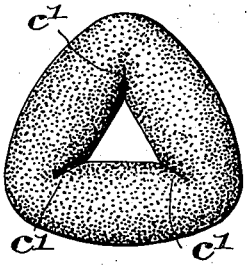
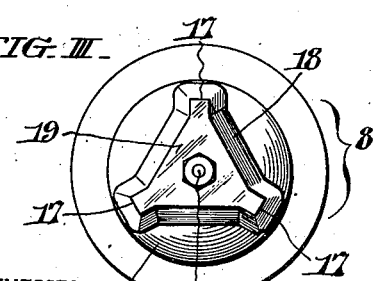
WITNESSES
INVENTOR:
William D. Bleier,
BY
ATTORNEYS.

Patented Mar. 15, 1927.

1,621,454

UNITED STATES PATENT OFFICE.

WILLIAM D. BLEIER, OF NEW YORK, N. Y., ASSIGNOR TO DOUGHNUT MACHINE CORPORATION, OF NEW YORK, N. Y., A CORPORATION OF NEW YORK.

DEVICE FOR FORMING ALIMENTARY PRODUCTS.

Application filed March 25, 1926. Serial No. 97,347.

This invention is concerned with the formation of alimentary products, such for example as doughnuts, crullers and the like, from plastic material. Predetermination of a definite shape with the usual annular type of doughnuts or crullers has been comparatively easy, but polygonal shapes, such as triangles, squares, etc., have been difficult of attainment—notwithstanding accurate initial cutting—on account of the unstable nature of the dough and its tendency to assume a rounded form incidental to frying in hot cooking liquor.

The purpose of my invention is to overcome the above difficulties, i. e., to provide an efficient and reliable means, especially useful in connection with automatic cooking apparatus of the kind shown and described in U. S. Letters Patent #1,492,542 granted to John C. Bergner under date of April 29, 1924, which will produce, with absolute regularity, polygonal formations capable of resisting distortion during cooking in spite of the inherent laxity of the dough.

In the drawings Fig. I shows, in axial section, the forming device of my invention and the manner of its use in connection with a dough magazine of the type illustrated in the patent supra.

Fig. II is a perspective view of the device itself on a larger scale than that of Fig. I.

Fig. III is an invert plan view of the same.

Fig. IV is a diagram showing the configuration of the raw extrusions cut by the device; and Fig. V is a similar view of a cooked doughnut pre-formed in accordance with my invention.

The movable element of the device has the form of a sleeve 6 which is axially slidable under guidance of the depending integral tubular neck 7 of a member 8. This member 8 serves as the outlet of the dough magazine M shown in Fig. I, it having bayonet lock connections with said magazine precisely as in the patent, so that the forming device may be conveniently removed for cleaning. At the medial region, the sleeve 5 has a circumferential groove 9 adapted to be occupied by inwardly projecting diametrical pins 10 at the ends of clevis arms of a yoke lever 11 that is fulcrumed to rock on a fixed axis 12 supported by a depending bracket 13 of the magazine M. This yoke lever 11 is intermittently actuated by tappet pins 14 on a spider 15 by which the formed articles are progressed in the cooking liquor L, all as described in the patent hereinbefore referred to. In the present instance, the opening 16 through the lower end of the sleeve 6 is triangular, and its corner angles have square counter-recessions as at 17 for a purpose which will be presently explained. The edges of the opening 16 are sharpened by external bevelling as at 18 for capacity to sever extrusions of the dough forced under pressure from the magazine M, through a perimetric die opening O normally maintained between the lower end of the sleeve 6 and a cooperative cutter disk 19 which is supported at the lower end of an axial stem 20 depending from the spider 21 within the hollow of the part 7. It will be noted that the configuration of the cutter disk 19 corresponds accurately to the opening 16 of the sleeve 6 so that an absolute clean cut is assured when said sleeve is moved downward to overlap the disk in severing the extrusions. The sleeve 6 is held against rotation through a sliding spline connection 22 with the part 7, and its triangular opening 16 thus maintained in exact registry with the cutter disk 19.

By virtue of the counter recessions 17 in the corner angles of the sleeve opening 16 the extrusions through the die opening are given the configuration shown in Fig. IV, from which it will be observed that the angles of the raw formation are emphasized at the crotches c, the spacing at these regions allowing access of the cooking liquor with the result that the dough is prevented from merging or "closing in" during the early stages of the cooking period. As the cooking proceeds, the dough is more or less restricted (through hardening of the skin) to expansion inwardly, with the result that the central opening of the formation becomes somewhat smaller, and the sides of the square angle recessions approach each other. After complete cooking, the doughnut appears as depicted in Fig. V with the triangular opening sharply defined by deeply incised corners at c'.

Having thus described my invention, I claim:

1. A forming device of the character described comprising a sleeve, and a cooperative co-axial cutter disk movable into overlapping relation in severing plastic extrusions through a perimetric die outlet normally maintained between them, the discharge opening of the sleeve being polygonal with counter-recesses at the corner angles and the disk configured to correspond in outline to the sleeve opening.

2. A forming device of the character described comprising a sleeve, and a cooperative co-axial cutter disk movable into overlapping relation in severing plastic extrusions through a perimetric die outlet normally maintained between them, the opening of the sleeve being polygonal with square counter-recesses at the corner angles, and the disk configured to correspond in outline to the sleeve opening.

3. A forming device of the character described, comprising a sleeve, and a cooperative co-axial cutter disk movable into overlapping relation in severing plastic extrusions through a perimetric die outlet normally maintained between them, the discharge opening of the sleeve being triangular with counter-recesses at the angles, and the disk configured to correspond in outline to that of the sleeve opening.

In testimony whereof, I have hereunto signed my name at 1170 Broadway, New York, this 22nd day of March 1926.

WILLIAM D. BLEIER.